United States Patent [19]

Jones

[11] Patent Number: 5,661,491
[45] Date of Patent: Aug. 26, 1997

[54] METHOD AND MEANS FOR REDUCING INTERFERENCES IN RADIO RECEIVERS

[75] Inventor: Peter Ernest Jones, Harlow, United Kingdom

[73] Assignee: Northern Telecom Limited, Montreal, Canada

[21] Appl. No.: 734,842

[22] Filed: Oct. 22, 1996

Related U.S. Application Data

[63] Continuation of Ser. No. 304,273, Sep. 12, 1994, abandoned.

[30] Foreign Application Priority Data

Oct. 12, 1993 [GB] United Kingdom .................. 9320935

[51] Int. Cl.$^6$ .................................................... G01S 3/52
[52] U.S. Cl. .............................. 342/418; 342/14; 342/16; 455/63; 455/298
[58] Field of Search ............................. 342/14, 16, 17, 342/418; 455/63, 298

[56] References Cited

U.S. PATENT DOCUMENTS

| | | | |
|---|---|---|---|
| 5,276,450 | 1/1994 | Schwegman | 342/16 |
| 5,450,448 | 9/1995 | Sheynblat | 375/346 |

OTHER PUBLICATIONS

Kayton, *Avionics Navigational Systems*, John Wiley & Sons, 1969, pp. 481–488.

*Primary Examiner*—Thomas H. Tarcza
*Assistant Examiner*—Dao L. Pham
*Attorney, Agent, or Firm*—Lee, Mann, Smith, McWilliams, Sweeney & Ohlson

[57] ABSTRACT

A method of reducing the effects of interference on a radio receiver having access to multiple transmission sources including the steps of monitoring the signals received from all available sources, utilising information derived from the received signals from each source to compute the most likely frequency band of the interference, determining from said most likely frequency in conjunction with known ephemeris for the receiver and the current Doppler shift of the source signals which sources are least susceptible to interference at said most likely frequency, and passing the identities of said least susceptible sources to the receiver acquisition software.

2 Claims, 3 Drawing Sheets

METHOD AND MEANS FOR REDUCING INTERFERENCES IN RADIO RECEIVERS

This application is a continuation of application Ser. No. 08/304,273, filed Sep. 12, 1994, now abandoned.

FIELD OF THE INVENTION

This invention relates to a method and means for reducing the effects of interference on radio receivers having access to multiple transmission sources, such as systems accessing multiple satellites.

It has long been known that GPS, which is a multiple source system, is vulnerable to interference. For defence purposes, even the PPS GPS receivers are therefore often integrated with INS, or with adaptive antennas to lessen their vulnerability. In civil aviation, however, only SPS is available with the more vulnerable C/A code and jamming resistant techniques are less common. Of late there have been proposals for multiple source telecomunication systems for mobile radiotelephones using satellites instead of terrestrial base stations.

In the case of GPS a key aspect of the problem caused by jamming is the way the correlator, which de-spreads the wide band GPS signals to a narrow band signal, simultaneously spreads the narrow band jammer signal to a wide band signal, thus lessening its effect. The correlator in the GPS receiver multiplies the received RF signal with a local replica of the relevant PRN code sequence. When the locally generated code is phase aligned with the received satellite signal then the code sequence is effectively stripped from the unwanted signal, collapsing its bandwidth from 2.046 MHz between nulls to the region of 100 Hz associated with the data modulation. The same process will spread a CW jammer over a null to null bandwidth of 2.046 MHz corresponding to the spectrum of the relevant code. Since the GPS C/A code repeats every 1 mS, the spectrum so generated in the receiver is not a continuous spectrum but a line spectrum with the lines separated by 1 kHz (the inverse of 1 mS).

Since the GPS receiver has a narrow post correlation bandwidth adequate only to pass the 50 bit per second data, in general only one such spectral line will interfere with the wanted signal at any one time. The magnitude of the power in each spectral line with respect to the original received jamming power is determined by the spectrum of the relevant PRN code, and the frequency offset (i.e. which spectral line).

On average the power per spectral line is 'Za' given by:

$$Za = 10 * \log 10 \, [2*10^6 / 1*10^3] = 33 \text{ dB}$$

which is the ratio of the 2 MHz controlled by the switching rate in the code, and the 1 kHz controlled by the code repetition rate.

But since the switching gives rise to a $\sin(x)/x$ type voltage spectrum, the spectral density is some 3 dB stronger near the centre frequency, effectively lowering the protection to some 30 dB. This is illustrated in FIG. 1.

GPS SPS satellite signals are centred on the L1 frequency, 1575 MHz. Each satellite has a unique PRN code, although the chipping rates are the same for all satellites and the code repetition rates are likewise the same for all satellites. This uniqueness in codes leads to differences in the fine structure of the line spectrum of the signal between different satellites. FIG. 2a illustrates a typical fine line structure for one satellite code (PRN 20) while FIG. 2b shows a fine line structure for another satellite code (PRN 21). The frequency of the signals will also be modified by the Doppler effect due to the line of sight velocity between each satellite and the observer, which can lead to shifts of up to 30 kHz. Thus a receiver tracking PRN 20 is very vulnerable to a jammer 1 kHz from L1, but relatively safe with respect to the same jammer when tracking PRN 21, the difference between the satellites being around 10 dB. The reasonable near worst case is that the protection available is some 26 dB rather than the average 33 dB obtainable from Za derived above. Similar problems are expected in the case of satellite based telecomms systems, especially those using spread spectrum techniques.

SUMMARY OF THE INVENTION

According to the present invention there is provided a method of reducing the effects of interference on a radio receiver having access to multiple transmission sources, including the steps of monitoring the signals received from available sources being tracked by the receiver, utilising information derived from the received signals from each source to compute the most likely frequency band of the interference and determining from said most likely frequency in conjunction with known current ephemeris data of the receiver and the current Doppler shift of the source signals which sources are least susceptible to interference at said most likely frequency, and passing the identity of said least susceptible sources to the radio receiver acquisition software.

BRIEF DESCRIPTION OF THE DRAWINGS

An embodiment of the invention will now be described with reference to the accompanying drawings, in which:

FIG. 5a and 5b illustrate typical frequency offset/carrier to noise profiles for two different satellites.

DESCRIPTION OF THE PREFERRED EMBODIMENT

Figure 1:
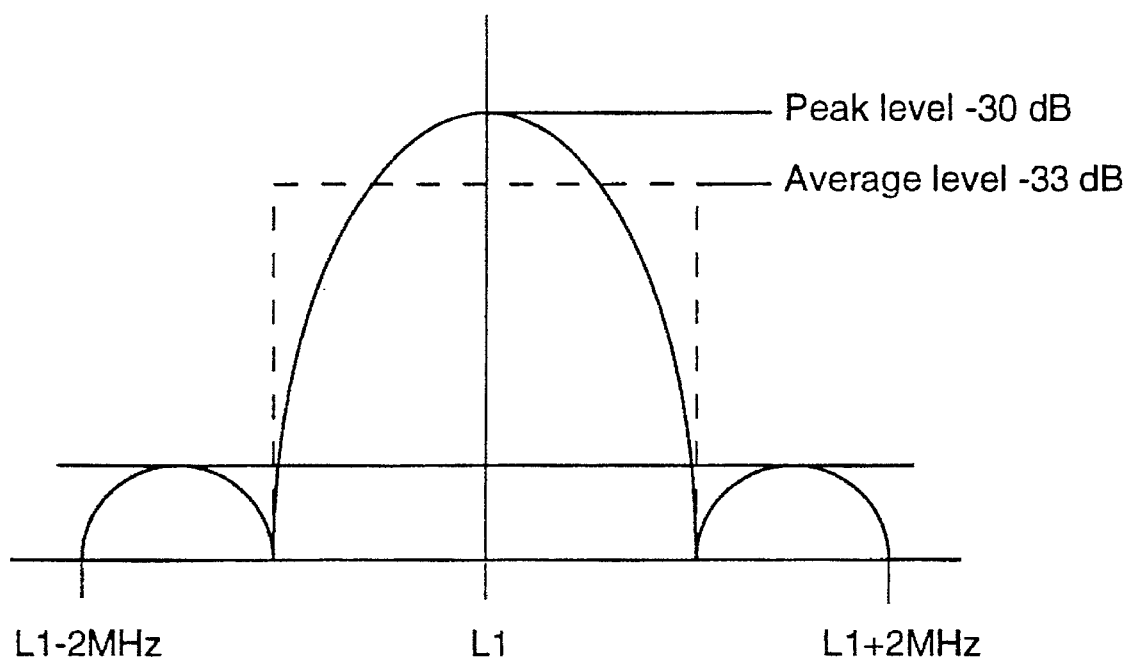
FIG. 1 (already referred to) shows a comparison of $\sin(\chi)/\chi$ type voltage spectrum with average power per spectral line.
Figure 3:
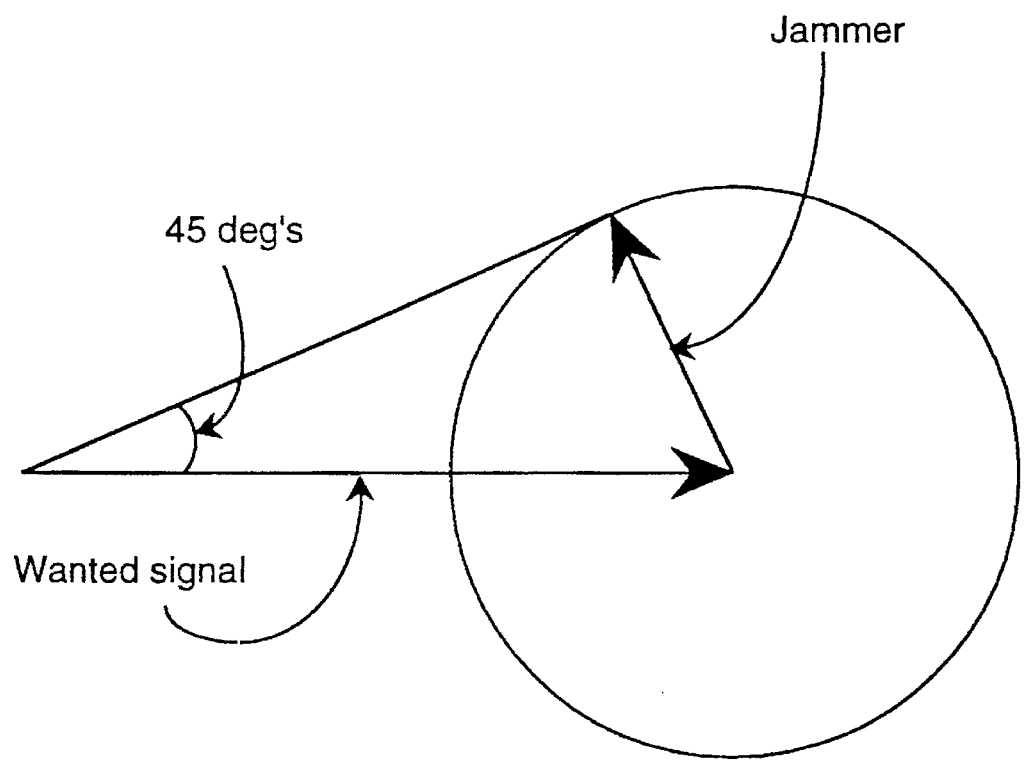
FIG. 3 illustrates the vector sum of a wanted GPS signal and a jamming or interfering signal.
Figure 2A:
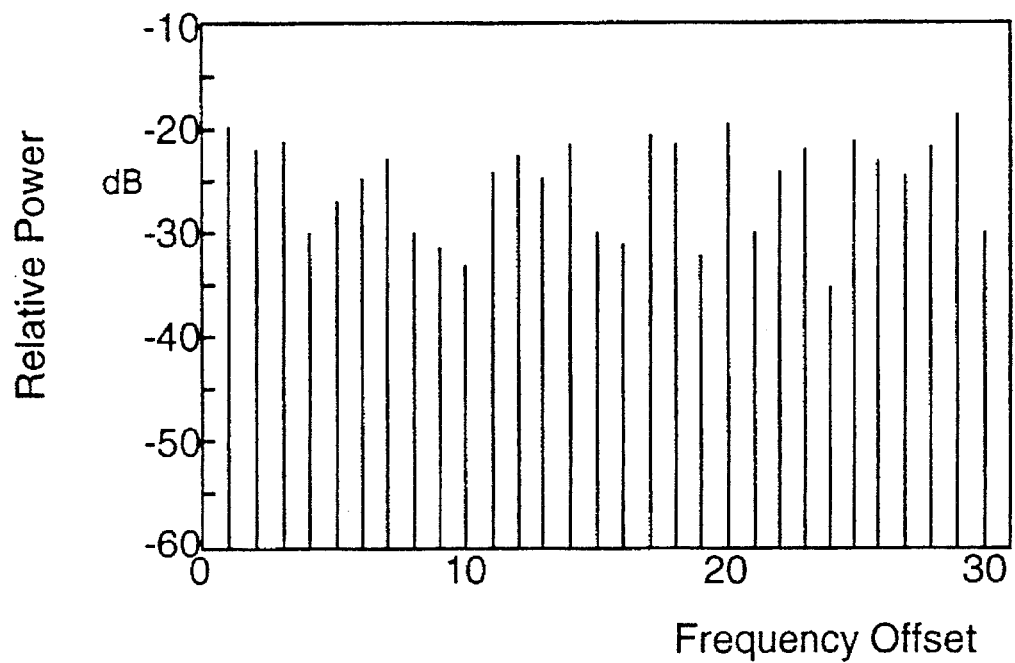
FIGS. 2a and 2b (already referred to) illustrate fine structures of GPS line spectra near the L1 frequency for two different satellite codes.
Figure 2B:
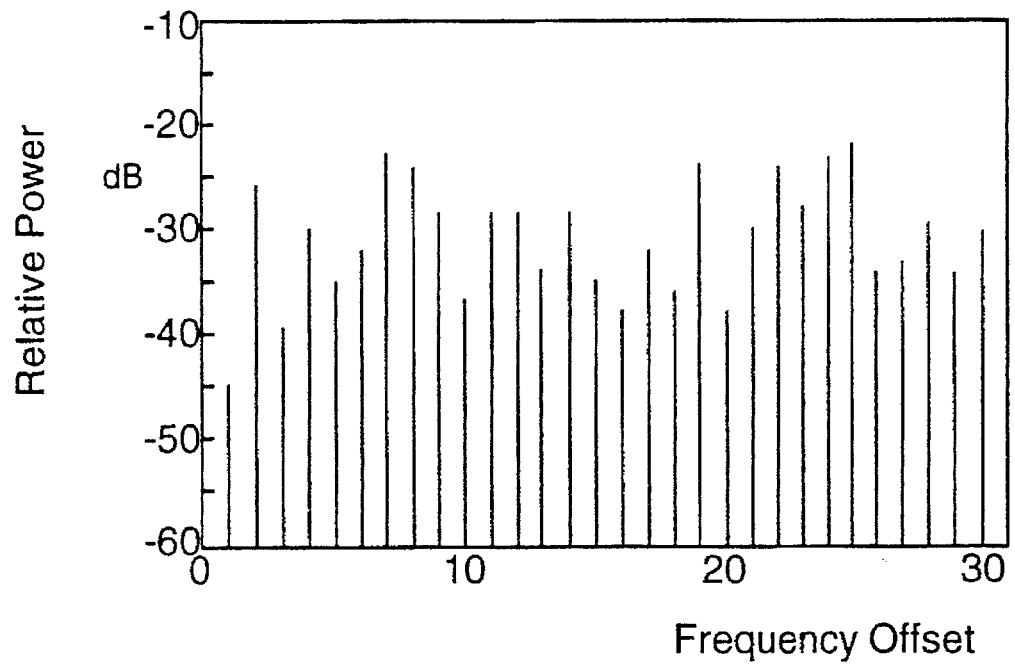

It is reasonable to assume that many satellite using receivers will use a carrier tracking function implemented by a Costas loop. In these loops an interfering signal must not cause the vector sum (wanted plus unwanted signals) to deviate by more than 45 degrees of angle relative to the wanted signal. With reference to FIG. 3, the maximum tolerable jammer voltage is then J given by:

$$J = \sin(45)$$

corresponding to a level of 3 dB below the wanted signal. It is likely that many receivers will require a higher ratio during acquisition. The GPS specification gives −160 dBW as the minimum signal level for L1 C/A code using an antenna having 0 dBic gain. A realistic antenna mounted on an aircraft is more likely to have a gain of about −3 dBic at +5 degree elevation angle, such that the minimum power level from a satellite will be −163 dBW at +5 degree elevation.

To maintain carrier tracking the maximum tolerable jammer signal after the correlator is thus −163−3=−166 dBW.

By determining the frequency of any interference signal and considering the line spectrum and frequency shift of each satellite signal it is possible to select from the visible satellites those that have the lowest susceptibility to interference at that frequency for acquisition by a receiver.

Figure 4:
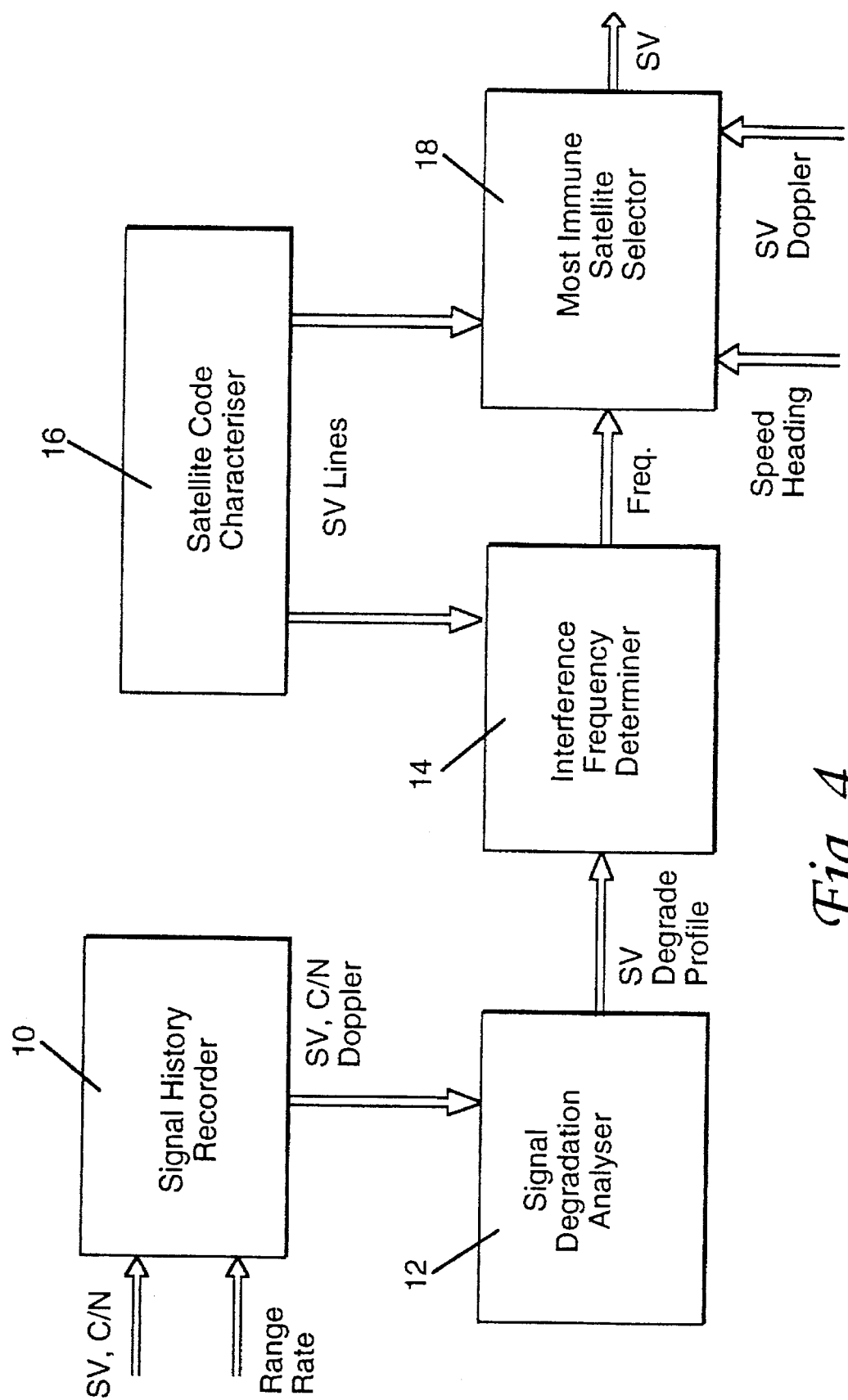
FIG. 4 is a block diagram of an arrangement for determining the identity of those satellites least susceptible to interference.

In the arrangement shown in FIG. 4 a signal history recorder 10 receives a signal from signal receiver 8 and stores a history of the measured signal level and Doppler shift of the signal frequency, determined from range rate measurements, for each acquired satellite. The signal history recorder is basically a cyclic multistage buffer in which is stored, for each acquired satellite, the Doppler frequency offset of the L1 carrier at frequent intervals, e.g. every second, together with the receiver's estimate of the received signal level (carried noise). Table I illustrates a typical signal history.

|  | Frequency offset | C/N |  |  |
|---|---|---|---|---|
|  | 1000 | 39 |  |  |
|  | 1010 | 29 |  |  |
|  | 1020 | 31 |  |  |
|  | 1040 | 39 |  |  |
|  | 1100 | 39 |  |  |
|  | 1070 | 28 | → | OUT pointer |
| IN pointer (oldest) | → 990 | 37 |  | (latest) |

The Doppler frequency offset will change second by second due to vehicle and satellite motion.

Should a satellite be lost the buffer will contain data for a period of time immediately preceding the loss. Table II illustrates this situation.

|  | Frequency offset | C/N |  |  |
|---|---|---|---|---|
|  | 1020 | 38 |  |  |
|  | 1010 | 32 |  |  |
|  | 1000 | 28 |  |  |
|  | 990 | 35 |  |  |
|  | 1000 | 27 | → | OUT pointer |
| IN pointer (oldest) | → 990 | 34 |  | (latest) |
|  | 1000 | 29 |  |  |
|  | 1010 | 33 |  |  |
|  | 990 | 28 |  |  |
|  | 1000 | 29 |  |  |

Should a satellite signal become lost a signal degradation analyser 12 uses this recorded history to calculate degradation profiles (frequency offset/carrier to noise) of all the satellites being tracked at the time of loss. These profiles describe the deterioration of the satellite signals with respect to time and Doppler shift. FIGS. 5a and 5b illustrate typical profiles for two different satellites. An interference frequency determiner 14 uses a database of the line spectrum of each satellite, obtained from a satellite code characteriser 16, together with the degradation profiles of the satellites to find the most likely frequency band of the interference. This is achieved by shifting the spectra of the satellites by their Doppler shift frequency, computing the signal degradation for that frequency and comparing that with the actual signal degradation. When the most likely interference frequency is known a satellite selector 18 utilises the information held in the code characteriser 16, the current speed and heading of the vehicle and the current Doppler shift of the satellites to find the visible satellites that are least susceptible to interference at the most likely interference frequency. The identities of the selected satellites are then passed to the receiver acquisition software 19. This process is repeated should further satellites be lost.

I claim:

1. A method of reducing the effects of interference on a radio receiver in a moving vehicle having access to multiple transmission sources, comprising the following steps:

a. monitoring signals received from available transmission sources being tracked by the receiver;

b. recording measured signals comprising measured signal level, noise to signal ratio and Doppler shift of a transmission source, determined from range rate measurements for each transmission source, using a signal history recorder;

c. determining an actual signal level degradation for the measured signals;

d. shifting the line spectra of each transmission source obtained from a transmission source code characterizer by their Doppler shift frequency, computing a signal degradation for that frequency;

comparing the computed signal degradation with the actual signal degradation;

determining a most likely frequency and utilizing information held in a code characterizer, current speed and heading of the moving vehicle and the current Doppler shift of each transmission source to select the transmission sources that are least susceptible to interference; and h. passing the identities of the selected transmission sources to receiver acquisition software of the moving vehicle.

2. A method according to claim 1 wherein the steps are repeated when signals from one or more of the monitored transmission sources are lost.

* * * * *